US012462232B2

(12) United States Patent
Sherwin

(10) Patent No.: US 12,462,232 B2
(45) Date of Patent: Nov. 4, 2025

(54) OPEN WALLET FOR ELECTRONIC TRANSACTIONS

(71) Applicant: CardinalCommerce Corporation, Mentor, OH (US)

(72) Inventor: Francis M. Sherwin, Cleveland Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 1187 days.

(21) Appl. No.: 15/950,332

(22) Filed: Apr. 11, 2018

(65) Prior Publication Data

US 2018/0232726 A1    Aug. 16, 2018

Related U.S. Application Data

(63) Continuation of application No. 13/622,733, filed on Sep. 19, 2012, now abandoned.

(60) Provisional application No. 61/536,275, filed on Sep. 19, 2011.

(51) Int. Cl.
*G06Q 20/08* (2012.01)
*G06Q 20/32* (2012.01)
*G06Q 20/36* (2012.01)
*G06Q 20/40* (2012.01)

(52) U.S. Cl.
CPC ..... *G06Q 20/0855* (2013.01); *G06Q 20/3223* (2013.01); *G06Q 20/363* (2013.01); *G06Q 20/409* (2013.01)

(58) Field of Classification Search
CPC ................ G06Q 20/0855; G06Q 20/36–3678
See application file for complete search history.

(56) References Cited

U.S. PATENT DOCUMENTS

| 5,815,657 | A | 9/1998 | Williams et al. |
| 7,051,002 | B2 | 5/2006 | Keresman, III et al. |
| 8,880,434 | B2 * | 11/2014 | Bemmel ............ G06Q 20/3274 705/67 |

(Continued)

FOREIGN PATENT DOCUMENTS

| KR | 20020063351 A | 8/2002 |
| KR | 1020080064789 A | 7/2008 |

(Continued)

*Primary Examiner* — Jay Huang
(74) *Attorney, Agent, or Firm* — The Webb Law Firm

(57) ABSTRACT

A system and method for completing a transaction between a first party and a second party is provided. The method includes registering, with an open commerce wallet exchange (OCWE) system, a plurality of banking applications, and/or wallet applications. The method also includes associating a master credential with the plurality of banking applications and/or wallet applications, receiving a request from the merchant system to invoke the OCWE system to receive personal data corresponding to the consumer, and in response to receiving a request to invoke the OCWE system from the merchant system, determining, by the OCWE system, at least one banking application and/or wallet application stored on the consumer system and registered with the OCWE system. The method also includes communicating, to the consumer system, a request for personal data, and receiving, from the consumer system, the master credential and a selection of a banking application or a wallet application.

15 Claims, 2 Drawing Sheets

(56) References Cited

U.S. PATENT DOCUMENTS

| | | |
|---|---|---|
| 2001/0005840 A1 | 6/2001 | Verkama |
| 2001/0011250 A1 | 8/2001 | Paltenghe et al. |
| 2001/0037451 A1* | 11/2001 | Bhagavatula ........... H04L 63/08 |
| | | 713/155 |
| 2003/0140007 A1 | 7/2003 | Kramer et al. |
| 2005/0108117 A1 | 5/2005 | Newman |
| 2005/0256802 A1 | 11/2005 | Ammermann et al. |
| 2007/0095892 A1 | 5/2007 | Lyons et al. |
| 2007/0125840 A1 | 6/2007 | Law et al. |
| 2008/0010204 A1* | 1/2008 | Rackley, III ........... G06Q 20/14 |
| | | 705/45 |
| 2008/0126145 A1 | 5/2008 | Rackley, III et al. |
| 2008/0208744 A1 | 8/2008 | Arthur et al. |
| 2008/0270253 A1 | 10/2008 | Huang |
| 2009/0205036 A1 | 8/2009 | Slaton et al. |
| 2009/0234751 A1 | 9/2009 | Chan et al. |
| 2009/0254440 A1 | 10/2009 | Pharris |
| 2009/0307139 A1* | 12/2009 | Mardikar ............ H04L 63/0823 |
| | | 726/19 |
| 2009/0313147 A1 | 12/2009 | Balasubramanian et al. |
| 2010/0125495 A1 | 5/2010 | Smith et al. |
| 2010/0125510 A1 | 5/2010 | Smith et al. |
| 2011/0145049 A1 | 6/2011 | Hertel et al. |
| 2012/0030066 A1* | 2/2012 | Stringfellow ........ G06Q 20/204 |
| | | 705/26.41 |
| 2012/0036042 A1 | 2/2012 | Graylin et al. |
| 2012/0197740 A1 | 8/2012 | Grigg et al. |
| 2012/0290376 A1 | 11/2012 | Dryer et al. |
| 2013/0013499 A1 | 1/2013 | Kalgi |

FOREIGN PATENT DOCUMENTS

| | | |
|---|---|---|
| KR | 1020100123895 A | 11/2010 |
| WO | 2010056480 A1 | 5/2010 |
| WO | 2010056484 A2 | 5/2010 |

* cited by examiner

OPEN WALLET FOR ELECTRONIC TRANSACTIONS

CROSS-REFERENCE TO RELATED APPLICATIONS

This application is a continuation of U.S. patent application Ser. No. 13/622,733, filed Sep. 19, 2012, which claims the benefit of U.S. Provisional Application No. 61/536,275, filed Sep. 19, 2011, both of which are incorporated herein by reference in their entirety.

BACKGROUND

The present disclosure relates generally to methods and/or systems for mobile and/or electronic commerce. In particular, the present disclosure is directed to methods and/or systems that provide payment processing support for merchants conducting business over a telecommunications networks, such as the Internet and/or a wireless network. However, it is to be appreciated that the presently disclosed subject matter is equally amenable to other like applications and/or environments.

By way of background, mobile commerce is expanding rapidly throughout the world. Consumer adoption of smartphones has created the perfect storm for a new mobile payment ecosystem. More and more retailers and merchants are reaching their customers through mobile devices with targeted mobile messaging, mobile shopping applications, mobile optimized web sites, mobile search, social mobile applications, bar code scanning applications, location-based services, and the like. However, enabling payments in a user friendly way from a mobile device is still a challenge, which causes poor conversion to, and limits the potential of, this mobile payment ecosystem.

One specific challenge is that making payments requiring a user to enter payment data, billing data and shipping data is cumbersome. To address this challenge, there are many companies building "mobile wallets", which provide a container application that stores all a user's payment and personal data. The user can then access this data through a "single click". Although mobile wallets address the above-mentioned challenge, mobile wallets also create new challenges, including the need for a retailer or merchant to support many different mobile wallets, such as GOOGLE WALLET, VISA WALLET, AMEX WALLET, SPRINT WALLET, ISIS WALLET, MASTERCARD WALLET, and the like. Managing and building integrations and connections to a diverse wallet ecosystem, where each wallet solution is different, whether slightly or significantly, is challenging for a retailer or merchant. Further, minimal consumer adoption of mobile wallets diminishes the gains from supporting many different mobile wallets.

At the same time, consumers are readily adopting "mobile banking applications", such as native mobile applications and mobile optimized web applications. Mobile banking applications allow consumers to access credit card, bank account and other payment account data (e.g., PAYPAL, AMAZON PAYMENTS, etc.). Mobile banking applications are simple and easy for consumers to use and provide a great utility for people to manage their financial accounts on the go. However, most mobile banking applications are limited in that they are simply providing account servicing data, such as access to current balances, transaction history, branch and ATM locator data, and so on. Moreover, most mobile banking applications are specific to a particular bank and are unable to interact with other mobile banking applications and systems. Account holders with multiple mobile banking applications must maintain separate accounts for each so that they can engage in transactions with different systems.

The present invention provides new and improved methods and/or systems which overcome the above-referenced problems and others.

INCORPORATION BY REFERENCE

The following commonly assigned applications, the disclosures of each being completely incorporated herein by reference, are mentioned:
U.S. Pat. No. 7,051,002 entitled "Universal Merchant Platform for Payment Authentication," by Keresman, I I I et al.; and,
U.S. Patent Publication No. 2009/0313147 entitled "Alternative Payment Implementation for Electronic Retailers," by Balasubramanian et al.

BRIEF DESCRIPTION

In accordance with one aspect, a system for completing a transaction between a first party and a second party is provided. The system includes at least one program memory including processor executable instructions. The processor executable instructions include one or more banking applications and/or wallets including personal data to complete the transaction or access to the personal data. The processor executable instructions further include an open commerce wallet exchange (OCWE) module configured to receive a request for the personal data from the second party using an OCWE protocol, receive a selection of one of the banking applications and/or wallets from the first party, authenticate the first party using built-in authentication of the selected banking application and/or wallet, receive the personal data from the selected banking application and/or wallet, and provide the merchant with the personal data using the OCWE protocol to complete the transaction. The system further includes at least one processor executing the processor executable instructions of the program memory.

In accordance with one aspect, a method for completing a transaction between a first party and a second party is provided. The method is performed by at least one processor. A request for personal data to complete the transaction is received from the second party using an open commerce wallet exchange (OCWE) protocol. A selection of one of one or more banking applications and/or wallets is received from the first party. The one or more banking applications and/or wallets include the personal data or access to the personal data. The first party is authenticated using built-in authentication of the selected banking application and/or wallet. The personal data is received from the selected banking application and/or wallet, and the merchant is provided with the personal data using the OCWE protocol to complete the transaction.

In accordance with one aspect, a system for completing a transaction between a first party and a second party is provided. The system includes at least one processor programmed to receive a request for personal data to complete the transaction from the second party using an open commerce wallet exchange (OCWE) protocol. The processor is further programmed to receive a selection of one of one or more banking applications and/or wallets associated with the system from the first user. The one or more banking applications and/or wallets include the personal data or access to the personal data. The processor is further programmed to receive the personal data from the selected banking application and/or wallet and provide the merchant with the personal data using the OCWE protocol to complete the transaction.

DETAILED DESCRIPTION

Figure 1:
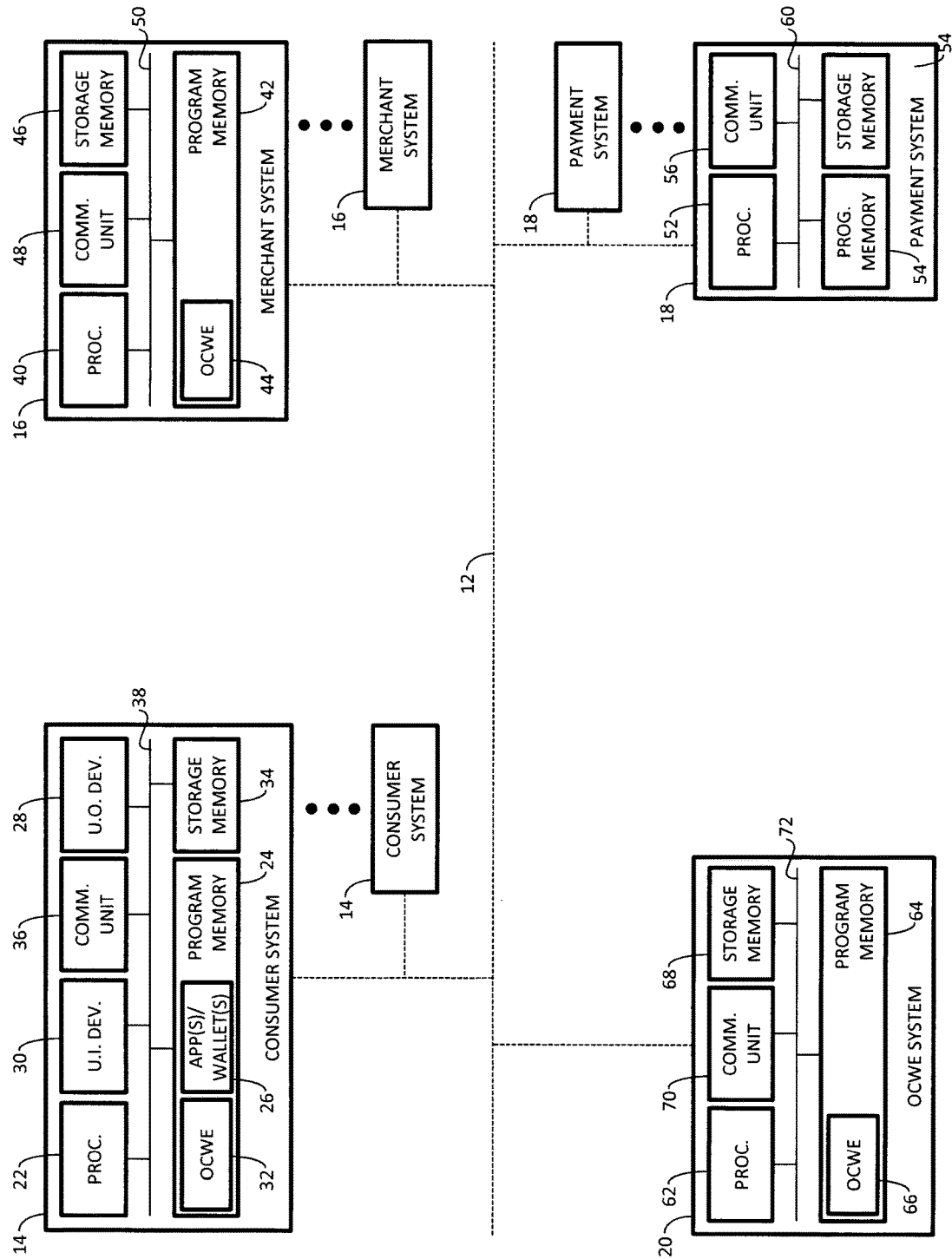
FIG. 1 is a block diagram of an exemplary system implementing an open commerce wallet exchange (OCWE); and, FIG. 2 is a sequence diagram of an exemplary transaction using the OCWE.

With reference to FIG. 1, a block diagram of an electronic commerce (eCommerce) system 10, such as a mobile commerce system, implementing an open commerce wallet exchange (OCWE) is provided. In a preferred embodiment, the OCWE provides an open exchange to allow consumers to securely share personal data to complete transactions with merchants in a common and seamless format. The personal data includes, for example, payment and/or fulfillment data.

The eCommerce system 10 includes a plurality of subsystems interconnected by one or more communication networks 12. The subsystems include one or more consumer systems 14, one or more merchant systems 16, and one or more payment systems 18. The subsystems can further include a central OCWE system 20. The communication networks 12 typically include the Internet, but can additionally or alternatively include other types of communication network. For example, the communication networks 12 can include one or more of a local area network (LAN), a wireless network, a wide area network (WAN), and the like.

A different party (e.g., a legal or natural person) typically provides each of the subsystems 14, 16, 18, 20 of the eCommerce system 10. However, it is also contemplated that the same party can provide a plurality of the subsystems 14, 16, 18, 20 of the eCommerce system 10. For example, a merchant can provide one of the merchant systems 16 and the OCWE system 20.

The consumer systems 14 allow the consumers to conduct transactions with the merchants over the communication networks 12, where personal data to complete the transactions is exchanged using the OCWE. The consumer systems 14 include a consumer system for each of the consumers. Further, the consumer systems 14 are typically mobile devices, such as mobile phones, but other types of digital processing devices, such as laptop computers, are contemplated.

Each of the consumer systems 14 includes a plurality of subcomponents. The subcomponents include at least one processor 22 and at least one program memory 24. The processor 22 executes the processor executable instructions, which are stored on the program memory 24, to conduct one or more transactions, each transaction as discussed in connection with FIG. 2.

One or more banking applications and/or wallets 26 of the processor executable instructions include personal data, or include access to personal data, needed to complete the transactions. Built in security of the banking applications and/or wallets 26 prevents unauthorized access to the personal data. A wallet provides a container that stores a user's payment and personal data. Wallets include, for example, GOOGLE WALLET, VISA WALLET, AMEX WALLET, SPRINT WALLET, ISIS WALLET, MASTERCARD WALLET, etc. A banking application provides a user access credit card, bank account and other payment account data. Banking applications include, for example, CITI CREDIT CARD MOBILE BANKING APPLICATION.

A user interface of the processor executable instructions allows the banking applications and/or wallets 26 to interact with the consumer. Namely, the user interface allows the banking applications and/or wallets 26 to present data to the consumer using a user output device 28 of the subcomponents, such as a display device. Further, the user interface allows the consumer to communicate with the banking applications and/or wallets 26 using a user input device 30 of the subcomponents, such as a keyboard.

The user interface further presents products and/or services sold by the merchants to the consumer using the user output device 28. Further, the user interface allows the consumer to select products and/or services to purchase from the merchants using the user input device 30. The user interface is typically a graphical user interface, such as a website of the merchant, presented to the consumer using the user output device 28. However, other types of user interfaces are contemplated, such as an interactive voice response (IVR) user interface.

After the consumer finishes selecting the products and/or services to purchase from a merchant, the processor executable instructions send a purchase request to the merchant system 16 corresponding to the merchant. The purchase request identifies the selected products and/or services and, in some embodiments, indicates that the consumer desires to employ the OWCE. The consumer can, for example, indicate that they are finished selecting products and/or services and/or desire to employ the OWCE using the user interface. In response to the purchase request, the merchant system 16 invokes the OWCE to request personal data from the consumer.

An OWCE module 32 of the processor executable instructions allows the merchant systems 16 to obtain personal data from the banking applications and/or wallets 26 using an OCWE protocol. The OWCE module 32 can, for example, be an application or built into an operating system of the consumer system 14. In one embodiment, the OCWE module 32 communicates with the merchant systems 16 through the OCWE system 20. In other embodiments, the OCWE module 32 communicates directly with the merchant systems 16. Suitably, the OCWE module 32 requires authentication of a merchant system 16 before communicating with the merchant system 16. The use of the OWCE module 32 and OWCE protocol allow for multiple different banking applications and/or wallet applications to be used, thereby allowing various disparate systems to interact to engage in a transaction.

In response to a request for personal data from a merchant, the OWCE module 32 determines a list of those banking applications and/or wallets of the banking applications and/or wallets 26 which support the OWCE and, in some embodiments, which the merchant system 16 of the merchant supports. To determine those banking applications and/or wallets which support the OWCE, the OWCE module 32 provides the banking applications and/or wallets 26 an interface with which to register with the OWCE (e.g., a set of application programming interfaces (APIs)). To determine those banking applications and/or wallets which the merchant system 16 supports, the request identifies those banking applications and/or wallets which the merchant system 16 supports.

After determining the list, the list is presented to the consumer using the user interface to allow the consumer to select the banking application and/or wallet to use for completing the transaction. The selected banking application and/or wallet is then invoked. By invoking the selected banking application and/or wallet, the banking application and/or wallet authenticates the consumer and allows the consumer to enter personal data, and/or otherwise select personal data maintained by the selected application and/or wallet, for completion of the transaction.

The personal data is then provided to the merchant system 16 using the OWCE. That is to say, the personal data is provided to the OCWE module 32 by way of an interface provided to the banking application and/or wallet. The interface can, for example, be a set of APIs provided by the OCWE module 32. The OCWE module 32 then provides the personal data to the merchant system 16 directly or by way of the OCWE system 20. In this way, the OCWE provides the merchant systems 16 a unified interface for accessing different banking applications and/or wallets, regardless of the differing communication protocols, data element requirements and/or transmission standards of the banking applications and/or wallets 26.

The OWCE module 32 can further allow consumers to register their individual banking application and/or wallet credentials and a master credential with any form of authentication. That is to say, a consumer can register with the OCWE and specify the individual credentials of the banking applications and/or wallets 26 of the consumer system 14 corresponding to consumer. The consumer can further specify master credentials and a type of authentication to use. The OWCE module 32 then proxies the differing authentication requirements of the banking application and/or wallets 26. In this manner, the use of a master credential allows for the unification of multiple different banking applications and/or wallet applications for a particular account holder.

The subcomponents further include at least one storage memory 34 and at least one communication unit 36. The storage memory 34 provides the processor 22 with storage of data. The communication unit 36 provides the processor 22 an interface to communicate with other subsystems of the eCommerce system 10 over the communication networks 12. The consumer system 14 further includes at least one system bus and/or communication network 38 interconnecting the subcomponents of the consumer system 14.

The merchant systems 16 allow the merchants to conduct transactions with the consumers over the communication networks 12, where personal data to complete the transactions is exchanged using the OCWE. The merchant systems 16 are each associated with one of the merchants. Further, each of the merchant systems 16 is comprised of one or more computer servers, typically a plurality of computer servers.

Each of the merchant systems 16 includes a plurality of subcomponents. The subcomponents include at least one processor 40 and at least one program memory 42. The processor 40 executes the processor executable instructions, which are stored on the program memory 42, to conduct one or more transactions, each transaction as discussed in connection with FIG. 2.

An OCWE module 44 of the processor executable instructions allows the merchant system 16 to obtain personal data from the consumer systems 14 using an OCWE protocol. In one embodiment, the OCWE module 44 communicates with the consumer systems 16 through the OCWE system 20. In other embodiments, the OCWE module 44 communicates directly with the consumer systems 14. Suitably, the OCWE module 44 requires authentication of a consumer system 14 before communicating with the consumer system 14.

Suitably, the merchant system 16 requests personal data from a consumer in response to receiving a purchase request form the consumer system 14 of the consumer. The purchase request identifies the products and/or services the consumer desires to purchase from the merchant. In some embodiments, the purchase request indicates that the consumer desires to employ the OWCE. This can be employed to determine whether to process the transaction traditionally or using the OWCE. In response to receiving the personal data, the merchant system 16 completes the transaction using the payment systems 18 as traditionally done. Alternatively, where the OWCE system 20 is employed, the OWCE system 20 completes the transaction on behalf of the merchant using the payment systems 18 as traditionally done. The merchant system 16 can provide an indication of the completed transaction to the consumer system 14 and/or the OWCE system 20.

The subcomponents further include at least one storage memory 46 and at least one communication unit 48. The storage memory 46 provides the processor 40 with storage of data. The communication unit 48 provides the processor 40 an interface to communicate with other subsystems of the eCommerce system 10 over the communication networks 12. The merchant system 16 further includes at least one system bus and/or communication network 50 interconnecting the subcomponents of the merchant system 16.

The payment systems 18 are each associated with a party to process payments for a merchant. Further, each of the payment systems 18 is comprised of one or more computer servers, typically a plurality of computer servers, and a plurality of subcomponents embodying the computer servers. The subcomponents include at least one processor 52 and at least one program memory 54. The processor executes the processor executable instructions, which are stored on the program memory 54, to complete transactions between the merchants and the consumers.

The processor executable instructions process payments for one or more payment brands, which provide one or more payment options. Payment brands include, for example, AMERICAN EXPRESS, DISCOVER FINANCIAL SERVICES, JCB INTERNATIONAL, and MASTERCARD WORLDWIDE AND VISA INTERNATIONAL, and payment options include, for example, credit card and debit card.

In some embodiments, the processor executable instructions additionally or alternatively process payments for one or more alternative payment brands, which provide one or more alternative payment options. Alternative payment brands include, for example, GOOGLE, PAYPAL, BILL ME LATER, MYECHECK, and SECURE VAULT PAYMENTS. Alternative payment options include, for example, GOOGLE CHECKOUT, PAYPAL EXPRESS, BILL ME LATER EXPRESS and BILL ME LATER BUSINESS.

The subcomponents further include at least one storage memory 56 and at least one communication unit 58. The storage memory 56 provides the processor 52 with storage of data. The communication unit 58 provides the processor an interface to communicate with other subsystems of the eCommerce system 10 over the communication networks 12. The payment system 18 further includes at least one system bus and/or communication network 60 interconnecting the subcomponents of the payment system 18.

The payment systems 18 are, for example, payment gateways or a universal merchant platform (UMP). The UMP provides a unified interface to the merchants for partially or wholly completing transactions. For the details of the UMP, attention is directed to, for example, U.S. Patent Publication No. 2009/0313147 entitled "Alternative Payment Implementation for Electronic Retailers," by Balasubramanian et al., or U.S. Pat. No. 7,051,002 entitled "Universal Merchant Platform for Payment Authentication," by Keresman, I I I et al., both incorporated herein by reference.

The OCWE system 20 is associated with a party providing a centralized OCWE for the merchants and the consumers to share personal data. The OCWE system 20 includes a plurality of subcomponents. The subcomponents include at least one processor 62 and at least one program memory 64. The processor 62 executes the processor executable instructions, which are stored on the program memory 64, to facilitate transactions between the merchants and the consumers.

An OCWE module 66 of the processor executable instructions relays personal data between the consumer systems 14 and the merchant systems 16. Typically, a merchant system 16 connects to the OCWE module 66 and requests personal data from a consumer system 14. The OCWE module 66 then relays the request to the consumer system 14. The OCWE module 66 further authenticate the consumer systems 14 and the merchant systems 16 before exchanging personal data. Authentication can be performed using authentication credentials, such as a password.

The OCWE module 66 can further allow consumers to register their individual banking application and/or wallet credentials in order to use a master credential with any form of authentication. That is to say, a consumer can register with the OCWE and specify the individual credentials of the banking applications and/or wallets 26 of the consumer system 14 corresponding to consumer. The consumer can further specify master credentials and a type of authentication to use. The OCWE module 66 then proxies the differing authentication requirements of the banking application and/or wallets 26.

The subcomponents further include at least one storage memory 68 and at least one communication unit 70. The storage memory 68 provides the processor with storage of data. The communication unit 70 provides the processor 62 an interface to communicate with other subsystems of the eCommerce system 10 over the communication networks 12. The OCWE system 20 further includes at least one system bus and/or communication network 72 interconnecting the subcomponents of the OCWE system.

Figure 2:
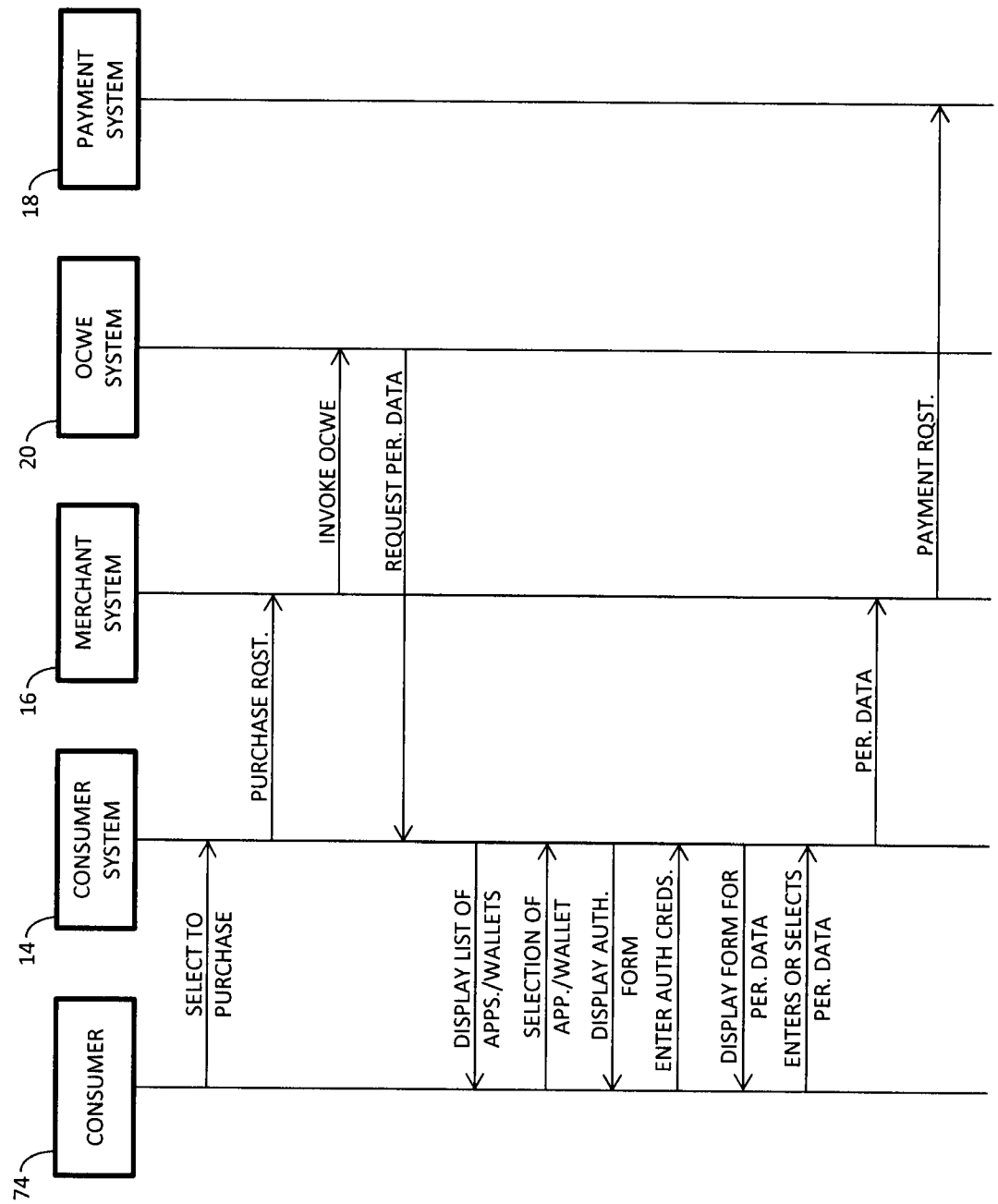

With reference to FIG. 2, a sequence diagram illustrating a transaction between a consumer 74 and a merchant, where the transaction is performed using the OCWE, is illustrated. To begin the consumer 74 selects products and/or services to purchase from the merchant using the consumer system 14 of the consumer 74. The consumer 74 then triggers the consumer system 14 to generate a purchase request and transmit the purchase request to the merchant system 16 of the merchant. The triggering can be performed by, for example, selecting a "buy" button on the user interface. The purchase request includes direct identification of the selected products and/or services or an identifier allowing indirect identification of the selected products and/or services.

In response to receiving the purchase request, the merchant system 16 invokes the OCWE to determine personal data, including payment and/or fulfillment data, for completing the transaction. The payment data identifies a payment option, such as an alternative payment option or a traditional payment option, and includes the necessary data to complete a transaction with the identified payment option. For example, with a traditional payment option, such as a credit card or debit card, the payment data may include a card number and an expiration date. The fulfillment data includes data necessary for fulfilling the merchant obligations after payment. For example, the fulfillment data can include a shipping address.

In invoking the OCWE, the merchant system 16 employs the OCWE communication protocol to request the personal data from the consumer system 14. As illustrated, this entails requesting the personal data by way of the OCWE system 20. However, it is also contemplated that the personal data can be requested directly from the consumer system 14. The consumer system 14, in response to receiving the request, determines a list of banking applications and/or wallets of the consumer system 14 which support the OCWE and, in some embodiments, which are supported by the merchant system 16. This list is displayed to the consumer 74 to select one of the banking applications and/or wallets to use for completing the transaction.

The selected banking application and/or wallet is then launched. The consumer 74, using the banking application and/or wallet authenticates using the existing authentication mechanism of the banking application and/or wallet. Further, the authenticated consumer 74 authorizes the exchange of the already present personal data of the banking application and/or wallet to the merchant system 16. Alternatively, the authenticated consumer 74 enters personal data. At this point, the personal data is provided to the merchant system 16. As illustrated, this is performed directly with the merchant system 16. However, it can also be performed indirectly by way of the OWCE system 20.

The merchant system 16 then processes the transaction with the received personal data using an existing payment process and the payment systems 18. Alternatively, the OWCE system 20 submits the personal data to the payment systems 18 on behalf of the merchant system 16. In the event banking applications and/or wallets have differing communication protocols, data element requirements and/or transmission standards, the OWCE can modulate, translate and communicate between all devices and or sites seamlessly.

Notwithstanding that the foregoing was described for transactions between merchants and consumers, transactions between retailers and consumers are also contemplated. In such an embodiment, the merchant systems 16 are used as retailer systems. Further, the transactions are typically performed face-to-face between the consumers and the merchants (or representatives of the merchants). Hence, the retailer systems can, for example, be point-of-sale systems.

The OWCE can further be employed to translate from form of communication protocol to another. For example, the OWCE initiates a wallet on a consumer system 14. Should the consumer wish to use their OWCE for other types of commerce, such as a gaming device, automobile, TV, etc., the merchant's single connection would link to the service in which differing communication protocols would be translated into the OWCE communication protocol.

Advantageously, the OWCE provides a unified interface to merchants and/or retailers for requesting personal data from banking applications and/or wallets. Merchants and/or retailers do not have to build numerous integration or "payment pipes" into tens of wallets and/or thousands of mobile banking applications. In the event banking applications and/or wallets have differing communication protocols, data element requirements and/or transmission standards, the OWCE can modulate, translate and communicate between all devices and or sites seamlessly.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a controller includes: (1) a processor and a memory, the processor executing computer executable instructions on the memory embodying the functionality of the controller; or (2) analog and/or digital hardware; a user input device includes one or more of a mouse, a keyboard, a touch screen display, one or more buttons, one or more switches, one or more toggles, voice recognition engines, and the like; a database includes one or more memories; and a display device includes one or more of a LCD display, an LED display, a plasma display, a projection display, a touch screen display, and the like.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A computer-implemented method for authenticating a transaction between a first party and a second party, comprising:
registering, with an open commerce wallet exchange (OCWE) system comprising at least one processor, a plurality of banking applications and/or wallet applications stored on a consumer system operated by a consumer by associating each application of the plurality of banking applications and/or wallet applications with at least one individual credential in at least one database, such that each application of the plurality of banking applications and/or wallet applications is associated with a different individual credential, and each different individual credential corresponds to the consumer;
associating, with the OCWE system, a master credential with the plurality of banking applications and/or wallet applications;
receiving, with the OCWE system, a request from a merchant system to invoke the OCWE system to receive personal data corresponding to the consumer, the request communicated from the merchant system in response to the merchant system receiving a purchase request comprising an indication that the consumer operating the consumer system desires to utilize the OCWE system to complete a transaction corresponding to the purchase request, the purchase request configured to cause the merchant system to invoke the OCWE system;

in response to receiving a request to invoke the OCWE system from the merchant system, determining, by the OCWE system, at least one banking application and/or wallet application stored on the consumer system and registered with the OCWE system;

communicating, with the OCWE system to the consumer system, a request for the personal data;

receiving, from the consumer system, the master credential and a selection of a banking application or a wallet application from the at least one banking application and/or wallet application; and authenticating, with the OCWE system, the consumer system based on the master credential and the selected banking application or wallet application.

2. The computer-implemented method of claim 1, further comprising causing the consumer system to communicate the personal data to the merchant system in response to authenticating the consumer system.

3. The computer-implemented method of claim 1, further comprising causing the consumer system to display a user interface comprising a list of the at least one banking application and/or wallet application.

4. The computer-implemented method of claim 3, further comprising causing the consumer system to display a user interface prompting the consumer to input or select the personal data in response to the consumer selecting the selected banking application or wallet application from the list.

5. The computer-implemented method of claim 1, wherein the OCWE system communicates with the merchant system using an OCWE protocol.

6. The computer-implemented method of claim 1, wherein the consumer system comprises an OCWE module, and wherein the OCWE system communicates with the consumer system via the OCWE module.

7. An open commerce wallet exchange (OCWE) system for authenticating a transaction between a first party and a second party, comprising at least one processor configured to:

register a plurality of banking applications and/or wallet applications stored on a consumer system operated by a consumer by associating each application of the plurality of banking applications and/or wallet applications with at least one individual credential in at least one database, such that each application of the plurality of banking applications and/or wallet applications is associated with a different individual credential, and each different individual credential corresponds to the consumer;

associate a master credential with the plurality of banking applications and/or wallet applications;

receive a request from a merchant system to invoke the OCWE system to receive personal data corresponding to the consumer, the request communicated from the merchant system in response to the merchant system receiving a purchase request comprising an indication that the consumer operating the consumer system desires to utilize the OCWE system to complete a transaction corresponding to the purchase request, the purchase request configured to cause the merchant system to invoke the OCWE system;

in response to receiving a request to invoke the OCWE system from the merchant system, determine at least one banking application and/or wallet application stored on the consumer system and registered with the OCWE system;

communicate a request for the personal data;

receive the master credential and a selection of a banking application or a wallet application from the at least one banking application and/or wallet application; and authenticate the consumer system based on the master credential and the selected banking application or wallet application.

8. The system of claim 7, wherein the at least one processor is further configured to cause the consumer system to communicate the personal data to the merchant system in response to authenticating the consumer system.

9. The system of claim 7, wherein the at least one processor is further configured to cause the consumer system to display a user interface comprising a list of the at least one banking application and/or wallet application.

10. The system of claim 9, wherein the at least one processor is further configured to cause the consumer system to display a user interface prompting the consumer to input or select the personal data in response to the consumer selecting the selected banking application or wallet application from the list.

11. The system of claim 7, wherein the OCWE system communicates with the merchant system using an OCWE protocol.

12. The system of claim 7, wherein the consumer system comprises an OCWE module, and wherein the OCWE system communicates with the consumer system via the OCWE module.

13. The computer-implemented method of claim 1, wherein the master credential is specified by the consumer during a registration process.

14. The computer-implemented method of claim 1, wherein the consumer system is authenticated based on a type of authentication, and wherein the type of authentication is specified by the consumer during a registration process.

15. The system of claim 7, wherein the master credential is specified by the consumer during a registration process.

* * * * *